Patented June 26, 1923.

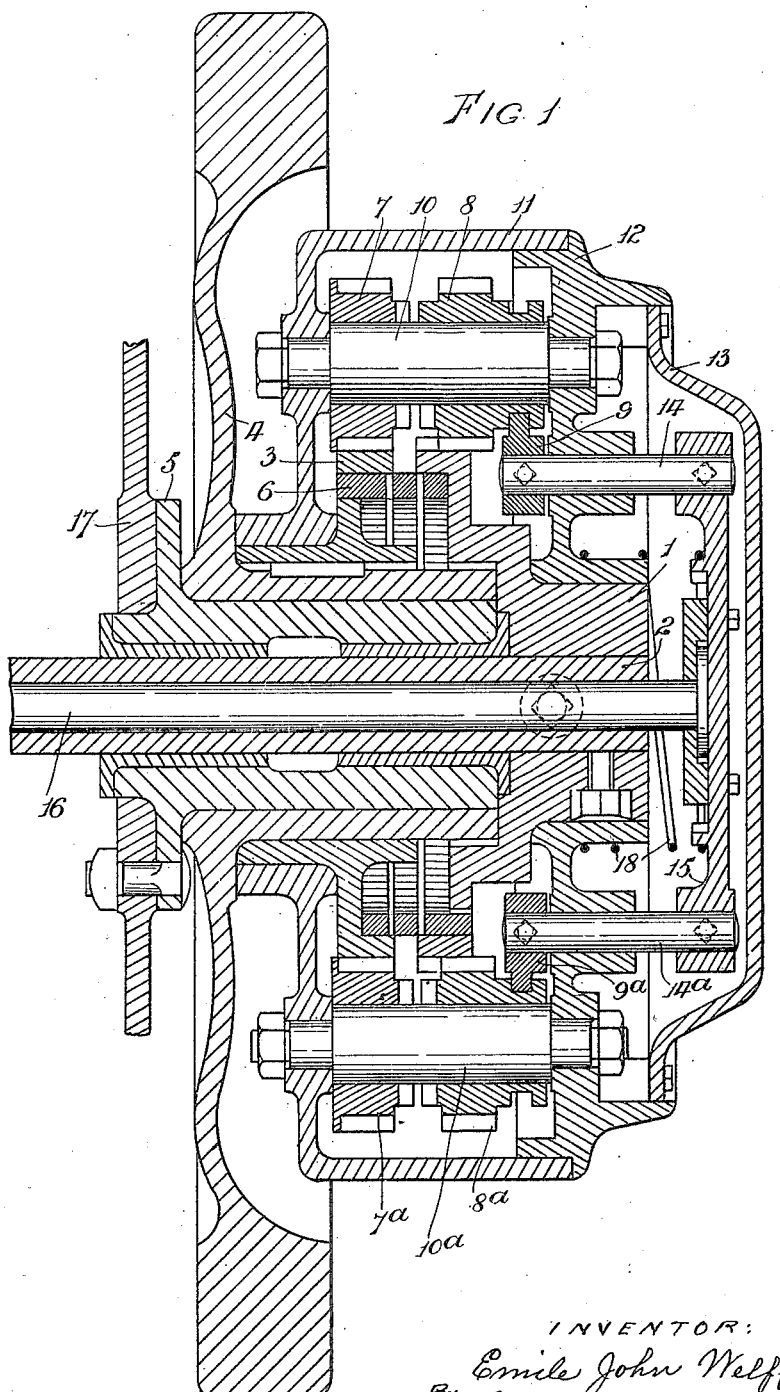

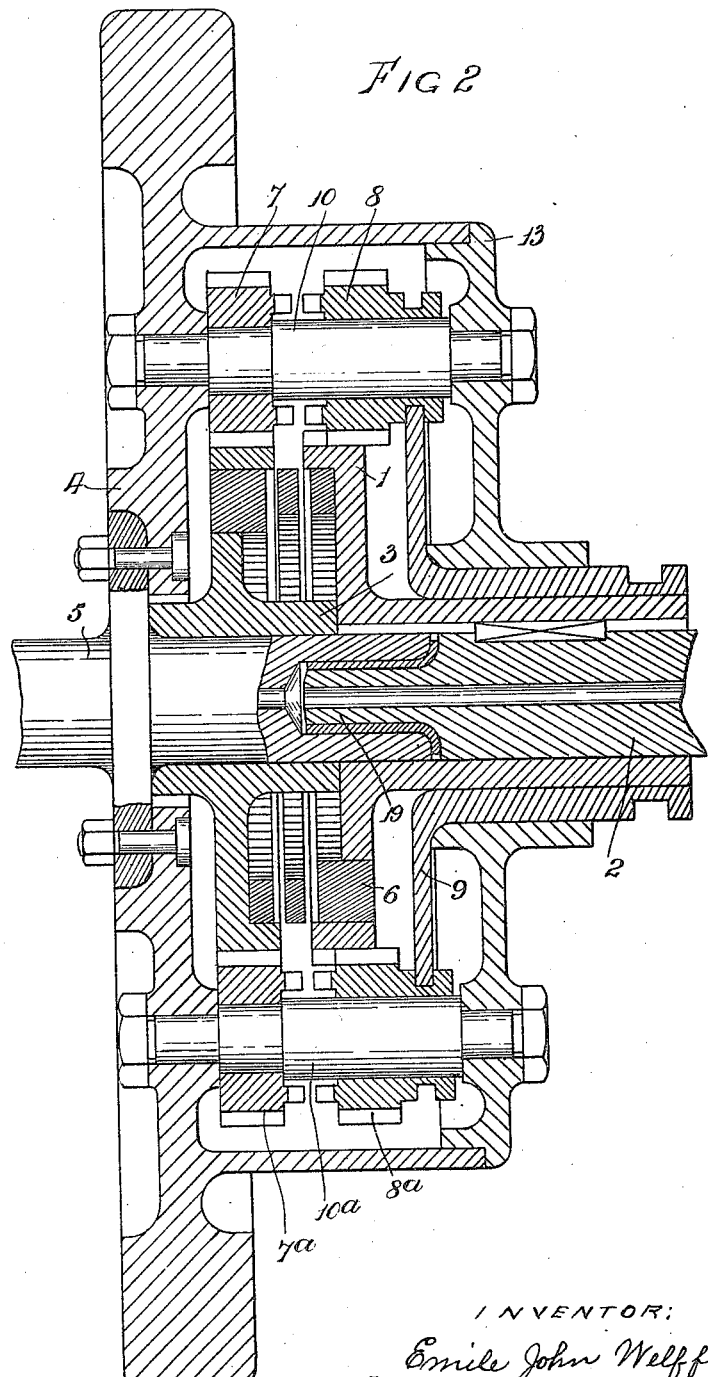

1,459,759

UNITED STATES PATENT OFFICE.

EMILE JOHN WELFFENS, OF MANCHESTER, ENGLAND.

MEANS FOR STARTING, STOPPING, AND DRIVING MACHINERY.

Application filed August 1, 1922. Serial No. 578,979.

*To all whom it may concern:*

Be it known that I, EMILE JOHN WELFFENS, a subject of the King of the Belgians, residing at 50 Duncan Road, Longsight, Manchester, in the county of Lancaster, England, have invented new and useful Improvements in or Relating to Means for Starting, Stopping, and Driving Machinery, of which the following is a specification.

The invention relates to novel arrangements for starting, stopping and driving machines, shafts and like contrivances.

All arrangements comprise planetary gearing, epicyclic or hypocyclic in action and wherein a driving member carries the planetary members provided with clutches, clutch operating gear and one or more springs. Some arrangements may comprise a flywheel, which may be a driving or a driven member, according to the result aimed at.

The invention will be explained with reference to the accompanying drawings, which clearly illustrate the principles involved. The various members may be disposed in a variety of ways according to the application.

When the explanation is understood, no difficulty will arise, whatever the result aimed at, in arranging the combination for application to any machine, mechanism or contrivance improvable by its incorporation.

Referring to the drawings:—

Figure 1 shows, in section, a combination, applicable to slubbing, roving and like frames, arranged to secure uniformity of motion besides starting, stopping and easy inching for the driven shaft or member;

Figure 2 illustrates, likewise in section, a combination, applicable to motor vehicles for example, arranged to further uniformity of motion in the driving member besides securing starting and stopping for the driven member.

In Figure 1 sun wheel 1 is fixed to driven shaft 2, sun wheel 3 is keyed to flywheel 4 revolubly mounted upon bearing 5. Spring 6 connects sun wheels 1 and 3. Shouldered planetary pinions 7 and 7$^a$ mesh permanently with sun wheel 3 and have lateral clutch teeth, pinions 8 and 8$^a$ mesh permanently with sun wheel 1, have lateral clutch teeth and a groove whereby they engage clutch forks 9 and 9$^a$. Studs 10 and 10$^a$ carry the planetary pinions revolubly, and are fixed in driving drum 11 and in ring 12, this ring carrying a cover plate 13, thus forming with drum 11 an oil bath for the combination. Studs 14 and 14$^a$, passing through ring 12 for support and location, connect the clutch forks 9 and 9$^a$ to arm 15, this arm engaging clutch rod 16, passing through driven shaft 2. 17 is the framing of the machine, to which bearing 5 is fixed and 18 is a spring tending to keep the planetary clutches out of engagement.

Assuming, that besides aiming at securing uniformity of motion for driven shaft 2, we also aim, as we should in combinations driving speed and like frames, at gradual starting, smooth stopping and easy inching of that shaft, and that the driving member 11 runs at 450 r. p. m., then with wheel 1 provided with 45 teeth, wheel 3 with 52 teeth, pinions 7 and 7$^a$ with 15 teeth and pinions 8 and 8$^a$ with 13 teeth, a wheel combination obtains which is capable of applying the full driving torque in a reasonable starting time by stressing spring 6 which, in section and design, is made proportional to the coiling effected by the combination as well as to the torque to be transmitted.

Both flywheel 4 through its mass and driven shaft 2 through its connection with the machine, possess inertia, the flywheel having the lesser moment. Consequently with member 11 running, and pinions 7, 7$^a$, 8 and 8$^a$, disconnected, drum and pinions will revolve around sun wheels 1 and 3 without imparting motion.

Clutching the pinions 7 and 7$^a$, 8 and 8$^a$ together sets flywheel 4 and sun wheel 3 keyed to it, slowly in motion, because it has less inertia than the shaft 2 and because the gear train as given above is such that it forces wheel 3 to precede wheel 1 slowly in driving direction. This motion of flywheel 4 and wheel 3 slowly coils spring 6 tighter, thereby it sets driven shaft 2 slowly in motion in driving direction. The speed of shaft 2 will gradually approach that of flywheel 4, which precedes it, with a concomitant diminution in the action of the planetary gearing until when the torsional stress in spring 6 equals the torque on shaft 2, flywheel 4, driven shaft 2 and driving member 11 all run at substantially the same speed and planetary action practically ceases. This illustrates the starting capacity of the combination.

Unclutching the pinions disconnects the driving power, the momentum stored up in the flywheel 4 spends itself in an effort to continue driving shaft 2 while the energy absorbed at starting in coiling spring 6 is usefully employed as an automatic brake stopping the machine smoothly because spring 6 must uncoil and uncoiling can occur only by accelerating shaft 2 or by retarding flywheel 4 and, since flywheel 4 has the lesser moment, it will be retarded. This illustrates the stopping capacity of the combination.

Since the modulation in speed obtaining is such that it enables the machine to pass smoothly from rest to full speed, any intermediate speeds will obtain smoothly. Therefore clutching and unclutching in quick succession will slowly inch the machine round, a necessity in speed and like frames for easy piecing up.

Fairly frequent clutching and unclutching in rapid succession implies smooth and easy clutch action if undue wear is to be avoided. Such clutch action obtains because pinions 7 and $7^a$, 8 and $8^a$, and consequently the clutches they carry, run constantly in the same direction with considerable peripheral velocities which approximate one another very closely. Taking the wheel gearing as given above namely 45:13 and 52:15 we find that the pinions run, per revolution of drum 11 at 3.461538 and 3.466666 revolutions respectively, 3.466666—3.461538=.005128 revolutions difference in peripheral velocity, showing them to be virtually equal with a concomitant smooth and noiseless operation of the clutches. This illustrates the inching capacity of the combination.

Where a driving pulley, fixed to driven shaft 2, fluctuates in speed, belt slip must occur, however, little, if uniformity of motion is to obtain in shaft 2. Consequently kinetic energy must be absorbed in causing that slip.

With the arrangement according to Figure 1, the driving pulley, drum 11, is not fixed to shaft 2. With the planetary pinions clutched together, sun wheels 1 and 3 are connected together positively. Neither can change its position without the other doing likewise when the torsional stress in spring 6 equals the torque on shaft 2. Both sun wheels, 3 by being fixed to flywheel 4 and 1 by being fixed to shaft 2, are connected to revolving masses indisposed to accept sudden variations in speed. Therefore, any fluctuations in drum 11, carrying the planetary pinions, spend themselves by oscillations around wheels 1 and 3 without calling for belt slip thereby leaving the entire kinetic energy developed free to further uniformity of motion. And the steadier the running of the machine, the greater the effect of a comparatively small amount of kinetic energy in furthering absolute uniformity of motion. This illustrates the steadying capacity of the combination, in which square clutch teeth are provided.

In Figure 2 sun wheel 1 is fixed to driven shaft 2, sun wheel 3 mounted revolubly and flywheel 4 fixed upon driving shaft 5. Spring 6 connects wheels 1 and 3. Planetary pinions 7 and $7^a$ mesh permanently with sun wheel 3 and have lateral clutch teeth, pinions 8 and $8^a$ mesh permanently with sun wheel 1, have lateral clutch teeth and a groove engaging clutch fork 9. Studs 10 and $10^a$, shouldered to keep pinions 7 and $7^a$ in position, also carry pinions 8 and $8^a$ and are fixed in flywheel 4 and cover plate 13, which form the oil bath in which the gearing is housed. The tup bearing 19 keeps both shafts in alignment.

Assuming that we aim at avoiding the jolting starts and concomitant engine overloads resulting from unskilful release of friction clutches, at present general in motor vehicles, then with a driving speed of 1500 r. p. m. and with wheel 1 having 97 teeth, wheel 3 having 93 teeth, pinions 7 and $7^a$ having 23 teeth and pinions 8 and $8^a$ having 24 teeth, suitable starting action will obtain.

Starting, stopping, inching and clutching capacities will be as described with reference to Figure 1. Square clutch teeth are again provided. It will now also be obvious, that fluctuations in driven member 2 can not affect the driving member 5 and that they will spend themselves in oscillating or revolving the pinions around their studs. Likewise acceleration will be very smooth and the inching capacity of the combination will materially facilitate gear changing. With the ignition cut off and shaft 2 driving, as in descent, spring 6 will slowly uncoil itself until its uncoiled stress equals the brake power supplied by the compression.

It will now be clear that the device may be used to drive looms, air compressors, motor vehicles and the like, wherein the load on the driven member is a very fluctuating one and that its application will prevent the recoil of such fluctuations upon the driving member. Likewise that the same device, with the addition of a free flywheel fixed to the free sun wheel, is useful for operating spinning machinery, printing presses and the like, wherein the driven load is a steady one and absolute uniformity of motion a desirable quality in the driven member.

In conclusion, it will be observed that the device operates without friction gear of any description and that its action is not unlike that of a combination of friction clutch, creeping clutch and spring without any of their disadvantages. The applicability of this device is manifold but the principle remains the same, and therefore, while I have described and illustrated practical embodiments of said principle, it is to be understood that the invention is not limited to the details of construction herein shown, but the same may be varied to meet any given requirements without departing from the spirit and scope of the claims hereto appended.

What I claim as my invention and desire to secure by Letters Patent of the United States is:—

1. A device of the class described, comprising, in combination, a driving member and a driven member, a sun wheel secured to said driven member for rotation therewith, a second sun wheel rotatable relative to said driven member, a resilient connection between said sun wheels, pairs of planetary pinions carried by said driving member, the pinions of each pair being in mesh with the respective sun wheels and having cooperating clutch members, and means for shifting one pinion of each pair thereby to bring the clutch members into operative engagement, the ratio of the gearing being such that when the clutch members are in engagement the resilient connection will be placed under tension by the rotation of the driving member.

2. A device of the class described, comprising, in combination, a driving member and a driven member, a fly wheel mounted for rotation relative to said driven member, a sun wheel secured to said driven member for rotation therewith, a second sun wheel rotatable with said fly wheel, a resilient connection between said sun wheels, pairs of planetary pinions carried by said driving member, the pinions of each pair being in mesh with the respective sun wheels and having cooperating clutch members, and means for shifting one pinion of each pair thereby to bring the clutch members into operative engagement, the ratio of the gearing being such that when the clutch members are in engagement the resilient connection will be placed under tension by the rotation of the driving member.

3. A device of the class described, comprising, in combination, a driving member and a driven member, a sun wheel secured to said driven member for rotation therewith, a second sun wheel rotatable relative to said driven member, spring means connecting said sun wheels and adapted to be placed under stress by the rotation of one relatively to the other, pairs of planetary pinions carried by said driving member, the pinions of each pair being in mesh with the respective sun wheels and having cooperating clutch members, and means for shifting one pinion of each pair thereby to bring the clutch members into operative engagement, the ratio of the gearing being such that when the clutch members are in engagement the spring means will be placed under tension by the rotation of the driving member.

4. A device of the class described, comprising, in combination, a driving member and a driven member, a sun wheel secured to said driven member for rotation therewith, a second sun wheel rotatable relative to said driven member, spring means connecting said sun wheels and adapted to be placed under stress by the rotation of one relatively to the other, pairs of planetary pinions carried by said driving member, the pinions of each pair being in mesh with the respective sun wheels and having cooperating clutch members, and means for shifting one pinion of each pair thereby to bring the clutch members into operative engagement, the ratio of the gearing and the section and design of the spring means being such that spring stress and driving torque equalize during the time lag allowed for relative rotation of said sun wheels.

In testimony whereof I have signed my name to this specification.

EMILE JOHN WELFFENS.